D. B. WESTIN
July 21, 1931. APPARATUS FOR HANDLING GLASSWARE Re. 18,133
Original Filed June 22, 1926
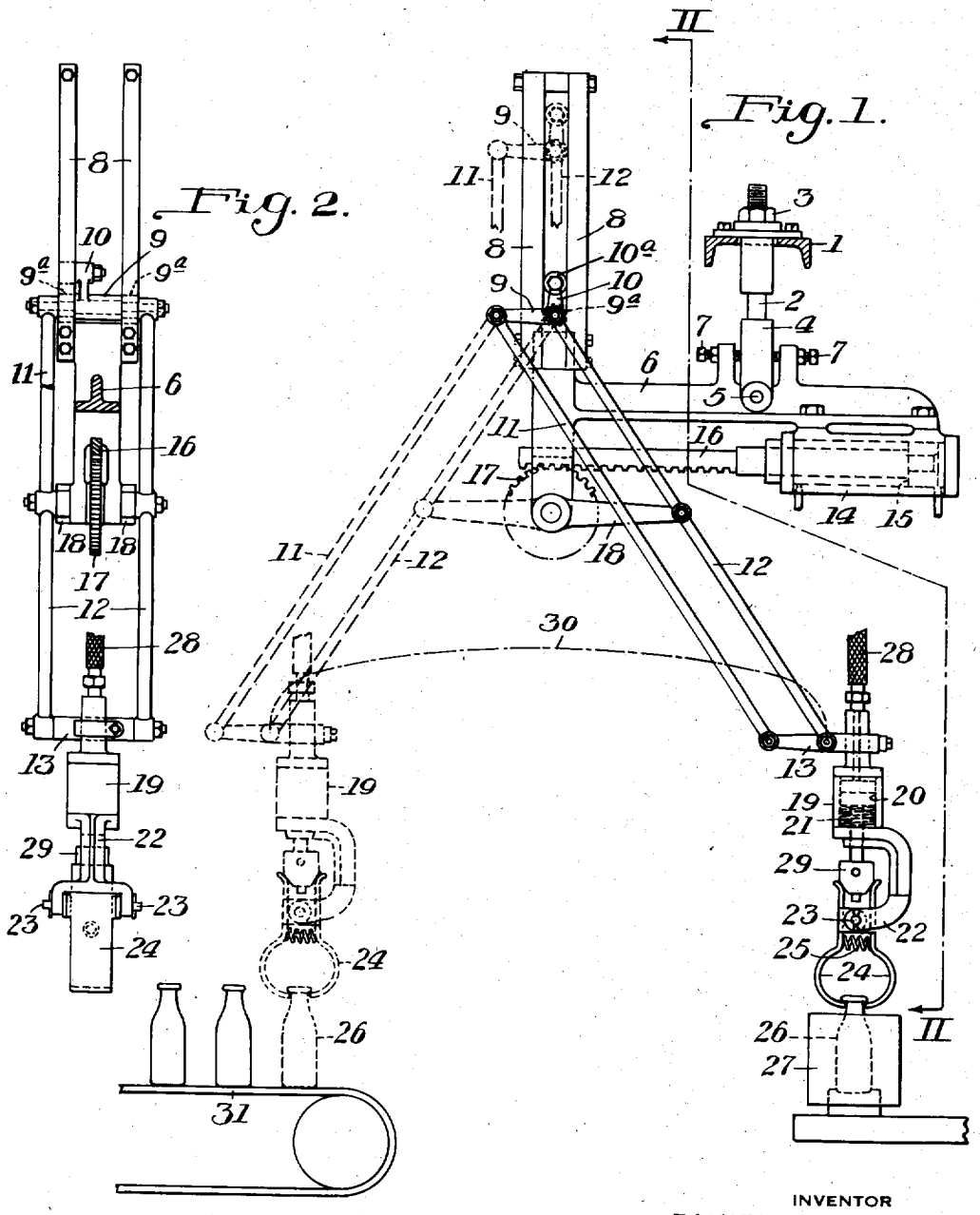
INVENTOR
DANIEL B. WESTIN
By Robson & Brown
Attorney Reissued July 21, 1931

Re. 18,133

UNITED STATES PATENT OFFICE

DANIEL B. WESTIN, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Original No. 1,766,573, dated June 24, 1930, Serial No. 117,745, filed June 22, 1926. Application for reissue filed May 8, 1931. Serial No. 536,047.

My invention relates to apparatus for handling glassware and other articles. It is especially useful for employment as a take-out device for removing glassware from forming molds to a conveyor, but is also suitable for employment in various other relations.

One object of my invention is to provide an improved form of handling mechanism for transferring glass articles, in an upright position, from a mold to a conveyor or other receiving surface.

Another object of my invention is to provide means for transferring bottles or the like through vertical and horizontal paths without danger of tipping them over at the picking-up and delivering stations.

Still another object of my invention is to provide an improved and simplified means for handling and transferring articles of various kinds.

The apparatus comprises means for lifting a bottle or similar article from a mold or other support by a pair of tongs and then carrying the article to a conveyor. When the tongs have released the article, they are moved vertically to clear it and are then returned to a position for transferring another article.

This application discloses apparatus which is somewhat similar to that shown and described in my copending application, Serial No. 117,744, filed on the same date as the present application.

One manner in which the invention may be practiced is shown in the accompanying drawings, wherein Figure 1 is a side elevational view of the apparatus, and Fig. 2 is an end elevational view, with parts in section on the line II—II of Fig. 1.

In the drawings, I have shown a supporting bar 1 through which extends a bolt 2 that is vertically adjustable in the bar by means of a nut 3. The bolt 2 carries at its lower end a block 4 that has a pin 5 on which a bracket 6 is pivotally supported. The bracket is adjustable about its pivot by means of set screws 7.

Vertically disposed guide members 8 are secured to the front end of the bracket 6 and serve as a slideway for a link-supporting member 9, which carries a pair of anti-friction rollers 9ª that roll in slots formed in the guides 8. The member 9 has an extension 10 which extends into one of said slots and is provided with an anti-friction roller 10ª. A pair of parallel arms 12 and a guide rod 11 are pivotally connected at their upper ends to the member 9 and at their lower ends have pivotal connection with a yoke member 13. A cylinder 14 is secured to the bracket 6 and is provided with a piston 15 that is connected to a rack bar 16. The rack bar 16 meshes with a pinion 17 that is journaled in a depending portion of the bracket 6 and carries crank extensions 18 which are pivotally connected to the arms 12. The arms 12 and the guide rod 11 form a parallel motion system which keeps the yoke 13 horizontal while being swung between the full-line and dotted line positions shown in Fig. 1.

The yoke 13 supports a cylinder 19 within which is located a piston 20 that is normally held in its uppermost position by a compression spring 21. A bracket arm 22 is connected to the cylinder 19 at one end and at its other end carries a pivot pin 23 that supports a pair of tongs or ware-gripping arms 24. The arms 24 are normally held in expanded position by a compression spring 25.

When it is desired to bring the tongs 24 into gripping engagement with a bottle 26 to remove it from a mold 27, fluid pressure is admitted through a pipe 28 to the cylinder 19 to move the piston downward against the compression of the spring 21 and force a wedge-shaped block 29 between the upper ends of the tongs 24, thereby moving said tongs about the pivot 23 and causing the jaw portions thereof to engage the bottle.

Immediately upon completion of the operation just described, air pressure is admitted to the right-hand end of the cylinder 14, forcing the piston 15 to the left and effecting rotation of the pinion 17 and crank arms 18 in a counter-clockwise direction. The tongs are thereby elevated in substantially a vertical direction for a distance sufficient to lift the bottle 26 clear of the mold. Continued movement of the cranks 18 results in the movement of the member 9 to the position shown in dotted lines and movement of the lower ends of the links 11 and 12 through a curved path, indicated by the dotted line 30, until they reach the position indicated by dotted lines at the left of Fig. 1, to deposit the bottle upon a conveyor 31 which may carry the ware toward or into a lehr (not shown).

The cylinder 19 is then relieved of air pressure, to permit upward movement of the piston 20 and the block 29, under the action of the spring 21, and allow the spring 25 to expand the tongs 24. Air pressure is then admitted to the left-hand end of the cylinder 14 to effect return movement of the parts, such return movement of the tongs being first in a substantially vertical direction and then in a generally horizontal direction, as indicated by the line 30.

The bracket 6 may be moved horizontally at intervals, to effect distribution of the bottles transversely of the conveyor 31 and thus to place the bottles in transverse rows thereon.

It will be apparent that, as the pivotal points of support for the upper ends of the links 11 and 12 are always in relatively fixed relation, the cylinder 19 and the tongs 24 will be always in vertical alignment and that the cylinder is held against idle swinging movement while being transferred from one position to another.

Fluid pressure will be admitted to the cylinders 14 and 19 at properly related times, through suitable valve control mechanism, so that the tongs will be actuated to grip a bottle when the piston 15 is in its extreme right-hand position and to release the bottle when the piston 20 is in its left-hand position.

The structure disclosed herein may be modified as desired, within the scope of the appended claims.

I claim as my invention:

1. Apparatus for removing glassware from molds, comprising a vertically disposed guide, a member mounted for movement in said guide, a supporting arm and a guiding arm pivotally connected at their upper ends to said member on laterally offset axes, said arms forming a parallel-motion system, a ware-supporting device having pivotal connection with the lower ends of said arms, and a crank device rotatable about a fixed axis and pivotally connected to one of said arms between the ends thereof.

2. Apparatus for removing glassware from molds, comprising a vertically disposed guide, a member mounted for movement in said guide, a supporting arm and a guiding arm pivotally connected at their upper ends to said member on laterally offset axes, said arms forming a parallel-motion system, a ware-supporting device having pivotal connection with the lower ends of said arms, a crank device rotatable about a fixed axis and pivotally connected to one of said arms between the ends thereof, and means for oscillating the crank in an arcuate path of approximately 180 degrees.

3. Apparatus for handling ware, comprising a pair of relatively fixed and laterally offset pivots, a pair of laterally spaced arms one of which is pivotally connected at its inner end to one only of said pivots and the other of which is pivotally connected at its inner end to the other only of said pivots, a ware-supporting member connected with the outer ends of said arm, and a single means for shifting the position of said pivot and for simultaneously shifting the arms about the pivots, the two movements being mutually interdependent.

4. Apparatus for handling ware, comprising a pair of relatively fixed and laterally offset pivots, a supporting arm and a guiding arm laterally spaced and connected at their inner ends to said supports, a ware-supporting member having pivotal connection with the other ends of said arms, and means for shifting the position of said pivots and for simultaneously swinging the arms about said pivots, comprising a crank connected to one of the arms and movable through an arcuate path.

5. Apparatus for handling ware, comprising a supporting member mounted for movement in a given path, an arm pivotally connected at one end to said member, a ware-supporting device having pivotal connection with the other end of said arm, means for shifting the position of said supporting member and for simultaneously rocking the arm about its pivot, in a direction substantially transverse to that of the said path, and means for moving said ware-supporting device about its pivot in definite relation to movement of said arm.

6. Apparatus for lifting glassware from a mold and transferring the same to a receiving surface, comprising a vertically disposed guide, a supporting member slidable in said guide, a pair of transversely spaced arms connected at their upper ends to said member, a bar pivotally connected to the lower ends of said arms, a ware-gripping device supported by said bar in a depending position, a crank arm connected to one of said arms intermediate the ends thereof, and means for oscillating said crank arm through a path of substantially 180 degrees, the said crank arm lying substantially in a horiontal plane at each extremity of its path of movement.

7. Apparatus for handling ware, comprising a supporting member mounted for movement in a given path, two arms each pivotally connected at one end to said member, a ware-supporting device connected to the other ends of said arms, said member, said arms, and said supporting device forming a parallel motion system, a crank connected to one of said arms at a point intermediate the ends thereof, fluid pressure means for actuating said crank, a ware-gripping member carried by said supporting device, and fluid pressure actuated means for operating said ware-gripping member.

8. Apparatus for handling ware, comprising a pivotally supported arm, article carrying means associated with said arm, means for constraining the point of pivotal support of said arm to move in a path substantially at right angles to a straight line drawn between a ware-receiving station and a ware-delivery station, and means for moving said arm to cause said point to move along said path and said arm to be swung about its pivotal support to move the said article carrying means between the ware-receiving station and ware-delivery station for transferring ware between said stations.

9. Apparatus for handling ware comprising an arm, means for constraining one point on said arm to move in a straight line, means for constraining another point on said arm to move in a circular path, means for moving said arm through a path as limited by the aforesaid means, article-supporting means connected to a third point on said arm, and means for maintaining said article-supporting means in a given angular relation with said line in all positions of said arm.

10. Apparatus for handling ware comprising an arm, means for constraining one point on said arm to move in a straight line, means for constraining another point on said arm to move in a circular path the center of which lies in a prolongation of said straight line, means to move said arm through a path as limited by the aforesaid means, article supporting means connected to a third point on said arm, and means for maintaining said article supporting means in a given angular relation with said line in all positions of said arm.

11. Apparatus for handling ware comprising an arm, means for constraining one point on said arm to move in a straight vertical line, means for constraining another point on said arm to move in a circular path disposed in a vertical plane, means for moving said arm through a path as limited by the aforesaid means, article supporting means connected to a third point on said arm, and means to maintain said article supporting means vertical in all positions of said arm.

12. Apparatus for transporting ware from a ware-receiving station to a ware-delivery station comprising a supporting member, means for constraining said supporting member to move in a vertical path substantially midway between said stations and perpendicular to a line joining them, an arm pivotally connected at one end to said member, a ware-supporting device connected to the other end of said arm, means connected to an intermediate point on said arm and constrained to move in a circular path in a vertical plane, the plane of said circular path including said vertical path and said line, means for moving said arm through a path as limited by the aforesaid means, and means to maintain said article supporting means vertical in all positions of said arm.

13. Apparatus for handling ware, comprising a device for supporting an article in an upright position, a single means for effecting a compound uninterrupted movement of the article said movement comprising first a substantial portion in a direction substantially parallel to its longitudinal axis, then a portion in an arcuate path, and finally a substantial portion in a direction substantially the reverse of the initial movement, and means for maintaining the longitudinal axis of the article substantially in parallelism with the first named direction of movement, during the entire movement of the article.

14. Apparatus for handling glassware, comprising an arm, a ware-supporting element pivoted to said arm, means for constraining a point on said arm spaced from the pivotal support of said element to move in a circular path about a fixed center, means for constraining another point on said arm to move in a circular path the center of which moves concomitantly with the first named point, means to move said arm through a path as limited by the aforesaid means, and means for maintaining said ware-supporting element and an article carried thereby in an upright position during their movements.

15. Apparatus for handling glassware, comprising an arm, a ware-supporting element pivoted to said arm on a horizontally disposed pivot, means for constraining a point on said arm spaced from said pivot to move in a circular path about a fixed horizontal axis, means for constraining another point on said arm to move in a circular path in a vertical plane about an axis which moves concomitantly with the first-named point, said moving axis being always parallel with the first-named axis, means to move said arm through a path in a vertical plane as limited by the aforesaid means, and means for maintaining said ware-supporting element and an article carried thereby in vertical position during their movements.

16. Apparatus for handling glassware comprising an arm, a ware-supporting element pivoted to said arm, means for constraining a point on said arm spaced from the pivotal connection with said element to move through a circular path in a vertical plane, means for causing said arm to move about said point as a center whereby the path of movement of said ware-supporting element is the resultant of two superimposed circular movements, means for moving said arm and the ware-supporting means carried thereby through a path as limited by the aforesaid means, and means for maintaining said ware-supporting element and an article carried thereby in an upright position during their movements.

17. Apparatus for handling glassware, comprising a ware supporting element, an arm to which said element is pivotally connected, and means for effecting oscillatory movement of said arm and said element in a vertical plane to move said element between a ware-receiving station and a ware-delivery station, including means for reciprocating one point on said arm through a circular path in said plane, and means for constraining said arm to move in a circular path in said plane about said point as a center.

18. Apparatus for handling glassware, comprising a ware supporting element, an arm to which said element is pivotally connected, means for effecting oscillatory movement of said arm and said element in a vertical plane to move said element between a ware-receiving station and a ware-delivery station, including means for reciprocating one point on said arm through a circular path in said plane, means for constraining said arm to move in a circular path in said plane about said point as a center, and means for maintaining said ware supporting element substantially vertical throughout its movement for maintaining the longitudinal axis of an article carried by said element substantially vertical.

19. Apparatus for transferring ware from a ware-receiving station to a ware-delivery station, comprising a device for gripping an exposed end of the ware, and means for moving said device through a path in a vertical plane between said stations, including an arm mounted for movement in a vertical plane, means for moving said arm, means for constraining a point on said arm to move in a circular path disposed in said vertical plane, and means for constraining said arm to move about said point as a center.

Signed at Hartford, Connecticut, this 6th day of May, 1931.

DANIEL B. WESTIN.